United States Patent
Sundaram

(10) Patent No.: US 9,106,410 B2
(45) Date of Patent: *Aug. 11, 2015

(54) IDENTITY BASED AUTHENTICATED KEY AGREEMENT PROTOCOL

(71) Applicant: Alcatel Lucent, Murray Hill, NJ (US)

(72) Inventor: Ganapathy S. Sundaram, Hillsborough, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 67 days.

This patent is subject to a terminal disclaimer.

(21) Appl. No.: 13/932,573

(22) Filed: Jul. 1, 2013

(65) Prior Publication Data

US 2013/0297939 A1  Nov. 7, 2013

Related U.S. Application Data

(63) Continuation of application No. 12/372,242, filed on Feb. 17, 2009, now Pat. No. 8,510,558.

(51) Int. Cl.
*H04L 9/32* (2006.01)
*H04L 9/08* (2006.01)
*H04L 9/30* (2006.01)

(52) U.S. Cl.
CPC ............ *H04L 9/0847* (2013.01); *H04L 9/3073* (2013.01)

(58) Field of Classification Search
None
See application file for complete search history.

(56) References Cited

U.S. PATENT DOCUMENTS

| 6,886,096 | B2 | 4/2005 | Appenzeller et al. |
| 7,017,181 | B2 | 3/2006 | Spies et al. |
| 7,113,594 | B2 | 9/2006 | Boneh et al. |
| 2004/0123098 | A1 | 6/2004 | Chen et al. |
| 2004/0179684 | A1 | 9/2004 | Appenzeller et al. |
| 2005/0084100 | A1 | 4/2005 | Spies et al. |

(Continued)

FOREIGN PATENT DOCUMENTS

| EP | 0535863 A2 | 4/1993 |
| JP | 07-098563 A | 4/1995 |

(Continued)

OTHER PUBLICATIONS

X. Cao et al., "Identity-Based Authenticated Key Agreement Protocols Withouth Bilinear Pairings," IEICE Transactions on Fundamentals of Electronics, Communications and Computer Sciences, Engineering Sciences Society, Dec. 2008, pp. 3833-3836, vol. E91-A, No. 12.*

(Continued)

*Primary Examiner* — Brandon Hoffman
(74) *Attorney, Agent, or Firm* — Ryan, Mason & Lewis, LLP

(57) ABSTRACT

A key agreement protocol between a first party and a second party comprises the following steps from the first party perspective. An encrypted first random key component is directed to the second party, the first random key component having been computed at the first party and encrypted using a public key of the second party in accordance with an identity based encryption operation. An encrypted second random key component corresponding to the second party is received. The encrypted second random key component is decrypted using a private key of the first party. A session key for use in subsequent communications between the first party and the second party is computed based at least in part on the second random key component.

20 Claims, 2 Drawing Sheets

(56) References Cited

U.S. PATENT DOCUMENTS

| | | |
|---|---|---|
| 2005/0187877 A1 | 8/2005 | Tadayon et al. |
| 2007/0041583 A1 | 2/2007 | Boneh et al. |

FOREIGN PATENT DOCUMENTS

| | | |
|---|---|---|
| JP | 2004282657 A | 10/2004 |
| JP | 2005141200 A | 6/2005 |
| JP | 2007208410 A | 8/2007 |
| JP | 2007295366 A | 11/2007 |
| JP | 2010004288 A | 1/2010 |
| JP | 2010537541 A | 12/2010 |
| WO | 03017559 | 2/2003 |
| WO | 2004047352 | 6/2004 |
| WO | 2005001629 | 1/2005 |
| WO | 2005010732 | 2/2005 |
| WO | 2005040975 | 5/2005 |
| WO | PCT/US2010/023736 | 10/2010 |

OTHER PUBLICATIONS

X. Cao et al., "Identity-Based Authenticated Key Agreement Protocols without Bilinear Pairings," IEICE Transactions on Fundamentals of Electronics, Communications and Computer Sciences, Engineering Sciences Society, Dec. 2008, pp. 3833-3836, vol. E91-A, No. 12.

M.A. Azim et al., "An Efficient Elliptic Curve Cryptography Based Authenticated Key Agreement Protocol for Wireless Lan Security," IEEE High Performance Switching and Routing, May 2006, pp. 376-380.

R.W. Zhu et al., "An Efficient Identity-Based Key Exchange Protocol with KGS Forward Secrecy for Low-Power Devices," Science Direct, Theoretical Computer Science, May 2007, pp. 198-207, vol. 378, No. 2.

D. Boneh et al., "Identity-Based Encryption from the Weil Pairing," Advances in Cryptology—Proceedings of Crypto, 2001, pp. 1-31, vol. 2139.

X. Boyen et al., "Identity-Based Cryptography Standard (IBCS) #1: Supersingular Curve Implementations of the BF and BB1 Cryptosystems," Network Working Group, Request for Comments: 5091, Dec. 2007, 63 pages.

G. Appenzeller et al., "Identity-Based Encryption Architecture and Supporting Data Structures," Network Working Group, Request for Comments: 5408, Jan. 2009, 30 pages.

\* cited by examiner

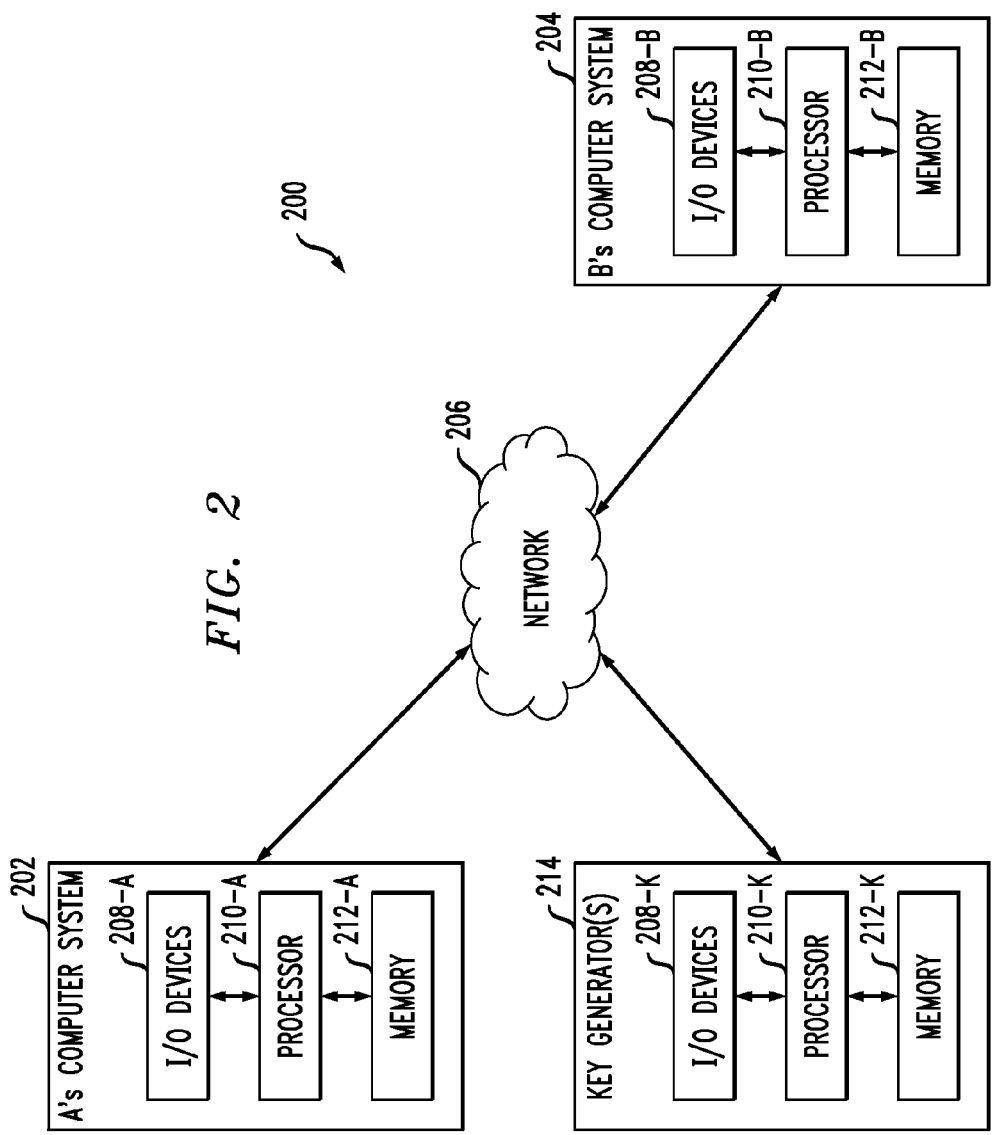

IDENTITY BASED AUTHENTICATED KEY AGREEMENT PROTOCOL

RELATED APPLICATION(S)

The present application is continuation of U.S. patent application Ser. No. 12/372,242, filed Feb. 17, 2009 and now patented as U.S. Pat. No. 8,510,558, the disclosure of which is hereby incorporated by reference herein.

FIELD

The present invention relates generally to cryptography and, more particularly, to an improved identity based authenticated key agreement protocol.

BACKGROUND

Cryptography is a well-known technique for providing secure communication between two or more parties. Authenticated Key Agreement is a cryptographic protocol where two or more participants, authenticate each other and agree on a key for future communication. These protocols could be symmetric key or asymmetric public key protocols. Recall that symmetric key protocols require an out-of-band security mechanism to bootstrap a secret key, while public key protocols require certificates and large scale public key infrastructure (PKI). Clearly, public key methods are a bit more flexible, however, the requirement of certificates and a large scale public key infrastructure has proved to be challenging.

Recently, Identity Based Encryption (IBE) protocols have been proposed as a viable alternative to public key methods by simplifying the PKI requirements and replacing them with a simple Key Generation Function (KGF) to generate private keys. However, one significant limitation of existing IBE methods is that the KGF can end up being a de-facto key escrow server with undesirable consequences. That is, since the KGF in the existing IBE protocol generates each private key used in the protocol, KGF can therefore decrypt all exchanges. This is an undesirable consequence since if KGF was compromised by an intruder, then exchanges between the two parties operating under the protocol would be compromised as well.

Thus, a need exists for an improved identity based authenticated key agreement protocol.

SUMMARY

Embodiments of the invention provide an improved identity based authenticated key agreement protocol.

For example, in one embodiment, a method for performing identity based encryption adapted to a communications session between a computer system of a first party (the first party) and a computer system of a second party (the second party) at the first party comprises the following steps. An encrypted first random key component is directed to the second party, the first random key component having been computed at the first party and encrypted using a public key of the second party in accordance with an identity based encryption operation. An encrypted second random key component corresponding to the second party is received. The encrypted second random key component is decrypted using a private key of the first party. A session key for use in subsequent communications between the first party and the second party is computed based at least in part on the second random key component.

Advantageously, embodiments of the invention provide an identity based authenticated key agreement protocol which does not suffer from the key escrow problem. Moreover, the protocol also provides perfect forward and backwards secrecy since computed key information is unrelated to any past or future authenticated key agreement sessions. Additionally, embodiments of the invention may be applied to various key agreement applications, by way of example only, end-to-end key agreement for applications over wired/wireless networks, and key agreement for networking protocols such as secure proxy based route optimization protocols.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 is a block diagram illustrating a generalized hardware architecture of a data network and computer systems suitable for implementing one or more of the protocols according to embodiments of the present invention.

DETAILED DESCRIPTION

Figure 1:
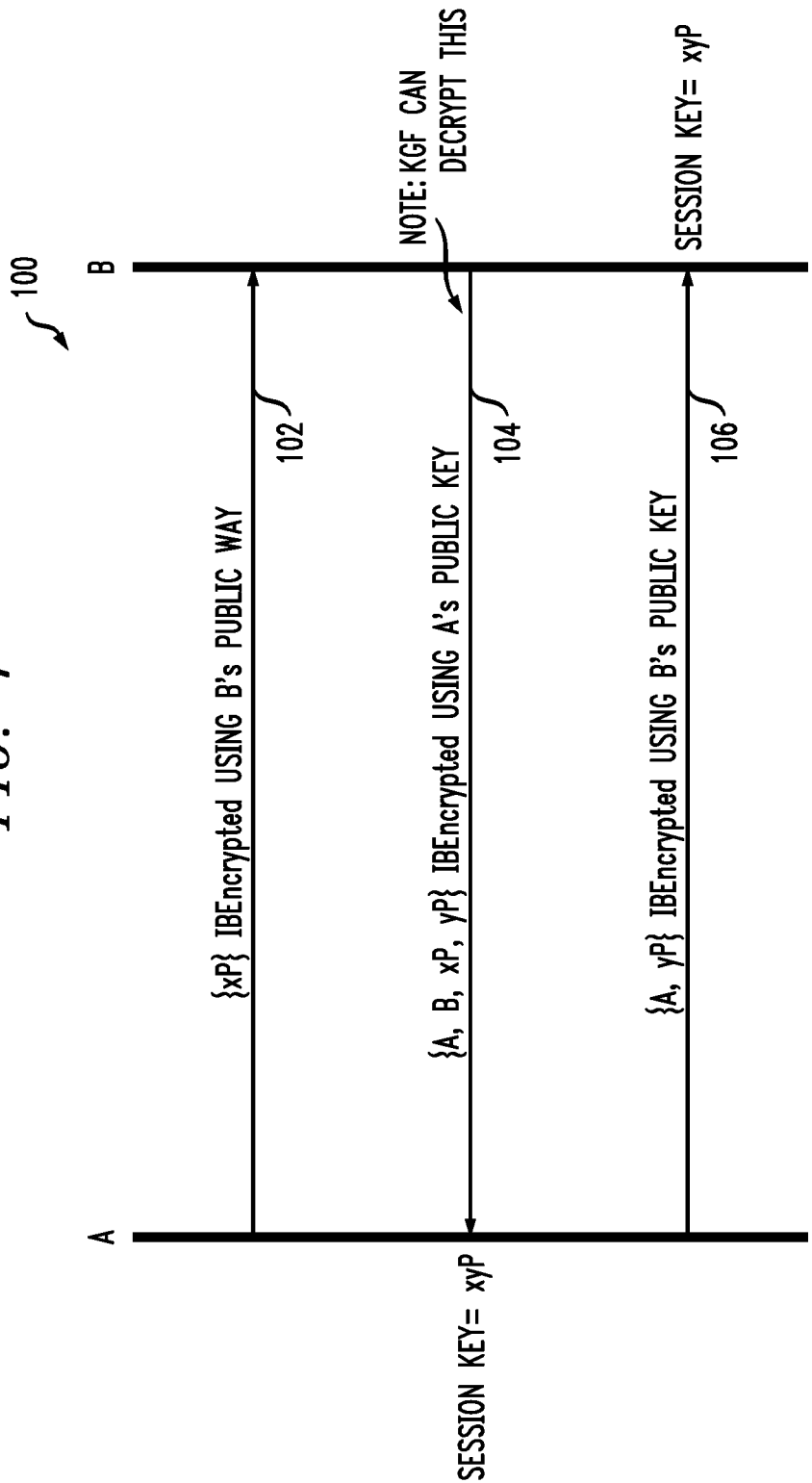
FIG. 1 is a flow diagram illustrating an identity based authenticated key agreement protocol in accordance with an embodiment of the present invention.

For ease of reference, the detailed description is divided as follows. An overview is provided of Identity Based Encryption (IBE) (section I). A review is provided of some examples of key agreement protocols including one involving IBE which has an inherent key escrow problem (section II). Embodiments of an improved identity based authenticated key agreement protocol according to the invention are then described in detail (section III) followed by a description of some illustrative applications (section IV). An illustrative computing system for implementing an improved identity based authenticated key agreement protocol according to the invention is then described (section V).

I. Identity Based Encryption

An Identity Based Encryption protocol was presented by Boneh and Franklin, see Dan Boneh, Matthew K. Franklin, "Identity-Based Encryption from the Weil Pairing" Advances in Cryptology—Proceedings of CRYPTO 2001 (2001), the disclosure of which is incorporated by reference herein. This asymmetric cryptographic encryption protocol allows participants to use an 'identity' (example: email-id, or domain name) as the public key and eliminates the need for large scale public key infrastructure which is often associated with public key encryption methods such as RSA (Rivest, Shamir and Adleman). Boneh and Franklin's approach to the problem uses bilinear maps on an elliptic curve over a finite field, and relies on the bilinear decisional Diffie-Hellman problem.

The protocol involves the following mathematical tools and parameters:

Let E be an elliptic curve over a finite field F, and let P be a point of large prime order.

Let e: $E \times E \rightarrow G$ be a bi-linear map on E. The typical example is the Weil pairing, and hence G will be the group of n-th roots of unity where n is a function of the number of points on E over F.

Let s be a non-zero positive integer and be a secret stored in a Key Generation Function (KGF). This is a system-wide secret and not revealed outside the KGF.

Let $P_{pub}=sP$ be the public key of the system that is known to all participants. Recall sP denotes a point in E, since E is a group.

Let $H_1$ be a known hash function that takes a string and assigns it to a point on the elliptic curve, i.e., $H_1(A)=Q_A$ on E, where A is usually the identity, and is also the public key of A.

Let $d_A=sQ_A$ be the private key computed by the KGF and delivered only to A.

Let $H_2$ be a known hash function that takes an element of G and assigns it to a string.

Let m be a message that has to be encrypted and sent to A. The encryption function described by Boneh and Franklin is as follows:

Let $g_A=e(Q_A, P_{pub})$, and let r be a random number.

$Encryption_A(m)=(rP, m \text{ xor } H_2(g_A^r))$; in other words the encryption output of m has two coordinates u and v where $u=rP$ and $v=m \text{ xor } H_2(g_A^r)$. Note that "xor" refers to the exclusive OR logic function.

In order to decrypt (u,v), A recovers m using the following formula:

$$m=v \text{ xor } H_2(e(d_A,u)).$$

The proof of the formula is a straight forward exercise in bilinear maps, and the fact A has the secret $d_A$ (private key known only to A but not other participants). Also observe that the KGF, which computed $d_A$ in the first place, can also decrypt the message resulting in the KGF being a de-facto key escrow server.

II. Key Agreement Protocols

There are primarily two categories of key agreement protocols—symmetric and asymmetric. Symmetric key agreement protocols rely on a secret key being shared between participants, and asymmetric key agreement protocols do not require participants to have any form of prior communications. Until recently, public key based key agreement protocols were the only asymmetric key agreement protocols, but the situation has since changed with the popularity of IBE based protocols. Examples of key agreement protocols are now provided.

Symmetric key based key agreement protocols are extremely popular. A typical example is the Authenticated Key Agreement (AKA) protocol used in 3G wireless systems. This is an example of a mutual authentication and session key agreement protocol based on a symmetric root key between the mobile subscriber's SIM (subscriber identification module) card and the home subscriber server. As pointed out above, symmetric key based key exchange protocols require the provisioning of a secret key between the participating entities.

Public key based key agreement protocols are used in many network layer and transport layer protocols and are based on certificates of public keys issued by a certificate authority. Examples include the public key version of the Internet Key Exchange (IKE) protocol used to derive a session key for IP (Internet Protocol) layer security protocols commonly referred to as IPsec. Another example is the key agreement protocol used in Secure Shell. All public key protocols used in an open setting require the use of certificates and a PKI.

Identity based key exchange protocols are gaining in popularity, and a simple example of an existing identity based protocol proposed for end-to-end encryption is where the entity originating the communication chooses a random key and encrypts it using the public key of the receiver and then transmits it. This transmission over an open network is secure because only the receiver can decrypt the message which contains the key. This existing protocol, while simple enough, does not authenticate the users prior to key exchange and suffers from the key escrow problems already described.

III. Identity Based Authenticated Key Agreement

In the illustrative embodiment described here, the basic set up for this protocol involves the mathematical constructs and parameters discussed in section I. Recall that this protocol is asymmetric but does not require any PKI support; instead the protocol employs an offline server which serves as a Key Generation Function. The details of the protocol are outlined below:

Suppose A, B are the two entities (or parties, where A represents a computer system of a first party and B represents a computer system of a second party) that are attempting to authenticate and agree on a key.

We will use A and B to represent their corresponding identities, which by definition also represent their public keys.

Let $H_1(A)=Q_A$ and $H_1(B)=Q_B$ be the respective points on the elliptic curve corresponding to the public keys. In effect, one could refer to $Q_A$ and $Q_B$ as the public keys as well, since there is a one-to-one correspondence between the identities and the points on the curve obtained by applying $H_1$.

Let x be a random number chosen by A, and let y be a random number chosen by B.

FIG. 1 illustrates the protocol exchanges between A and B. The protocol exchange 100 comprises of the following steps:

A computes xP (i.e., P added to itself x times as a point on E, using the addition law on E) encrypts it using B's public key, and transmits it to B in step 102. In this step, encryption refers to identity based encryption described in section I above.

Upon receipt of the encrypted message, B decrypts the message and obtains xP. Subsequently B computes yP, and encrypts the pair {xP, yP} using A's public key and then transmits it to A in step 104.

Upon receipt of this message, A decrypts the message and obtains yP. Subsequently, A encrypts yP using B's public key and sends it back to B in step 106.

Following this, both A and B compute xyP as the session key.

Observe that A chose x randomly, and received yP in the second step of the protocol exchange. This allows A to compute xyP by adding yP to itself x times. Conversely, B chose y randomly, and received xP in the first step of the protocol exchange. This allows B to compute xyP by adding xP to itself y times. Note that any application of the protocol may utilize header data with the identities to ensure proper functioning of the protocol. This is relatively standard and applicable to almost any protocol exchange for key agreement.

Note also that x is random but xP provides no information about x. Therefore, xP is a component of a key based on a random secret chosen by A. Likewise, y is random but yP provides no information about y. Hence, yP is a component of a key based on a random secret known only to B.

Note further that xyP can serve as a session key. Also, the session key could be any known function of xyP. That is, the session key could equal f(xyP), where f is known to both parties and is not required to be secret (i.e., known to the world). One practical requirement on f should be that f is hard to compute without knowledge of x or y, and the output is of a satisfactory length from a cryptographic perspective, e.g., around 128 bits or more.

Some of the properties of the protocol include:

Immunity from Key Escrow:

Observe that all the steps in the protocol exchange are encrypted using IBE. So clearly the KGF can decrypt all the exchanges. However, the KGF can not compute the session key. This is because of the hardness of the elliptic curve Diffie-Hellman problem. In other words, given xP and yP, it is computationally hard to compute xyP.

Mutually Authenticated Key Agreement:

Observe that all the steps in the protocol exchange are encrypted using IBE. In particular, only B can decrypt the contents of the message sent by A in steps 102 and 106, and similarly only A can decrypt the contents of the message sent by B in step 104. Moreover, at the end of step 104, A can verify B's authenticity since xP could have been sent in step 104 only after decryption of the contents in step 102 by B. Similarly, at the end of step 106, B can verify A's authenticity since yP could have been sent back in step 106 only after correctly decrypting the contents of step 104 and this is possible only by A. Finally, both A and B can agree on the same session key. In other words, the protocol is a mutually authenticated key agreement protocol based on IBE. While the above description provides the motivation for the security of the protocol, a cryptographic proof of security can be easily provided. The hardness of the protocol relies on the hardness of the Elliptic curve Diffie-Hellman problem, which is influenced by the choice of elliptic curve.

Perfect Forward and Backwards Secrecy:

Since x and y are random, xyP is always fresh and unrelated to any past or future sessions between A and B.

No Passwords:

Clearly, the inventive protocol does not require any offline exchange of passwords or secret keys between A and B. In fact, the method is clearly applicable to any two parties communicating for the first time through any communication network. The only requirement is to ensure that both A and B are aware of each other's public keys, for example, through a directory service.

IV. Example Applications

Two example scenarios where the inventive protocol of FIG. 1 can be used are now described.

A. End-to-End Key Agreement

Existing and emerging Internet and wireless applications are increasingly supported over 'open' networks. In addition, due to the explosion of security attacks, users are waking up to the desire for end-to-end privacy. This applies to client-to-client applications (such as Voice-over-IP, Instant Messaging, etc.) as well as server to client applications (such as e-commerce over the web). In all these applications, it is often not possible to have the participants agree on a secret key to use symmetric key based key agreement protocols, or register with a PKI to obtain a certificate for use in public key based key agreement protocols. In fact, end-users involved in client-to-client communication (for example, voice calls) may not even know each other in advance. Moreover, end-users who desire privacy and security will be very averse to key escrow since there are significant opportunities for miscreants to abuse the system. In these situations, Identity Based Authenticated Key Agreement protocols are an extremely attractive option. All that is required is individuals register with a Key Generation Service with their identity and obtain a private key. In fact, it is not required for the Key Generation Service to be unique and applicable to all participants.

Observe that in protocol exchanges outlined in the previous section (illustratively describing the inventive protocol), the encryption steps 102 and 106 could be based on one curve (applicable to B) and the encryption in step 104 could be based on a completely different curve (applicable to A). This allows for Key Generation Services to act independent of each other. However, it is important to ensure that all the parameters needed for encryption are publicly and easily available through a directory service. More importantly xP and yP should correspond to the same elliptic curve, but could be independent of the elliptic curves used for encryption.

B. Secure Proxy Based Route Optimization

Mobile wireless networks have undergone a tremendous evolution and the next generation of systems are attempting to enlarge into a fully packet and IP based routed public land mobile wireless data network. This would require conventional services such as voice, to be supported over IP (i.e., mobile Voice-over-IP). In this regard, it has been recognized that while the radio network has undergone tremendous improvements, routing in the core network needs to be optimized.

An authenticated key agreement protocol between visited gateways may be used to set up a security association in order to securely forward packets between each other. In particular, these visited gateways could be on two different operator networks with no prior knowledge of each other and the operators who own these network elements may not even have any service level agreement. In such scenarios, Identity Based Authenticated Key Agreement protocols are a very attractive alternative. As in the previous example, it is not required for the Key Generation Service to be unique and applicable to all network elements. In fact, each network operator could own and operate a simple offline Key Generation Server.

Observe that in protocol exchanges outlined in the previous section (illustratively describing the inventive protocol), the encryption steps 102 and 106 could be based on one curve (applicable to B) and the encryption in step 104 could be based on a completely different curve (applicable to A). This allows for Key Generation Services to act independent of each other. However, it is important to ensure that all the parameters needed for encryption are publicly and easily available through a directory service. More importantly, xP and yP should correspond to the same elliptic curve, but could be independent of the elliptic curves used for encryption.

V. Illustrative Computing System

FIG. 2 illustrates a generalized hardware architecture of a data network and computer systems suitable for implementing an improved identity based authentication key agreement protocol between two entities A and B according to the present invention. As shown, entity A comprises a computer system 202, while entity B comprises a computer system 204. The two computer systems 202 and 204 are coupled via a data network 206. The data network may be any data network across which A and B desire to communicate, e.g., the Internet. However, the invention is not limited to a particular type of network. Typically, A could be a client machine and B could be a server machine. Also, A and B could both be clients or both be servers. Thus, it is to be understood that the communication protocol of the present invention is not limited to the case where A and B are client and server, but instead is applicable to any computing devices comprising A and B.

Also shown in computer system 214 coupled to computer systems 202 and 204 via network 206. Computer system 214 is preferably a server that performs a Key Generation Function or Service, as described above.

As would be readily apparent to one of ordinary skill in the art, the servers and clients may be implemented as programmed computers operating under control of computer program code. The computer program code would be stored in a computer readable storage medium (e.g., a memory) and the code would be executed by a processor of the computer. Given this disclosure of the invention, one skilled in the art could readily produce appropriate computer program code in order to implement the protocols described herein.

Nonetheless, FIG. 2 generally illustrates an exemplary architecture for each computer system communicating over the network. As shown, computer system A comprises I/O devices 208-A, processor 210-A, and memory 212-A. Computer system B comprises I/O devices 208-B, processor 210-B, and memory 212-B. Computer system 214 (key generator(s)) comprises I/O devices 208-K, processor 210-K, and memory 212-K. It should be understood that the term "processor" as used herein is intended to include one or more processing devices, including a central processing unit (CPU) or other processing circuitry, including but not limited to one or more signal processors, one or more integrated circuits, and the like. Also, the term "memory" as used herein is intended to include memory associated with a processor or CPU, such as RAM, ROM, a fixed memory device (e.g., hard drive), or a removable memory device (e.g., diskette or CDROM). In addition, the term "I/O devices" as used herein is intended to include one or more input devices (e.g., keyboard, mouse) for inputting data to the processing unit, as well as one or more output devices (e.g., CRT display) for providing results associated with the processing unit.

Accordingly, software instructions or code for performing the methodologies of the invention, described herein, may be stored in one or more of the associated memory devices, e.g., ROM, fixed or removable memory, and, when ready to be utilized, loaded into RAM and executed by the CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for performing identity based encryption adapted to a communications session between a computer system of a first party (the first party) and a computer system of a second party (the second party), the method at the first party comprising the steps of:
sending an encrypted first random key component directed to the second party, the first random key component having been computed at the first party and encrypted using a public key of the second party in accordance with an identity based encryption operation;
receiving an encrypted second random key component corresponding to the second party;
decrypting the encrypted second random key component using a private key of the first party; and
computing a session key for use in subsequent communications between the first party and the second party based at least in part on the second random key component.

2. The method of claim 1, wherein the second random key component is received as part of an encrypted random key component pair that includes the first random key component and decrypting the encrypted second random key component comprises decrypting the encrypted random key component pair.

3. The method of claim 1, further comprising the step of sending the second random key component, in encrypted form, from the first party directed to the second party, the second random key component having been encrypted using the public key of the second party in accordance with the identity based encryption operation.

4. The method of claim 1, wherein an elliptic curve used to compute the first random key component is independent of an elliptic curve used for the identity based encryption operation.

5. The method of claim 1, wherein the first random key component, xP, is computed from a random number x chosen by the first party and a point P of large prime order on an elliptic curve over a finite field.

6. An apparatus for performing identity based encryption adapted to a communications session between a computer system of a first party (the first party) and a computer system of a second party (the second party), comprising:
a processor and a memory communicatively connected to the processor, the processor configured to:
send an encrypted first random key component directed to the second party, the first random key component having been computed at the first party and encrypted using a public key of the second party in accordance with an identity based encryption operation;
receive an encrypted second random key component corresponding to the second party;
decrypt the encrypted second random key component using a private key of the first party; and
compute a session key for use in subsequent communications between the first party and the second party based at least in part on the second random key component.

7. The apparatus of claim 6, wherein the second random key component is received as part of an encrypted random key component pair that includes the first random key component and decrypting the encrypted second random key component comprises decrypting the encrypted random key component pair.

8. The apparatus of claim 6, the processor further configured to send the second random key component, in encrypted form, from the first party directed to the second party, the second random key component having been encrypted using the public key of the second party in accordance with the identity based encryption operation.

9. The apparatus of claim 6, wherein an elliptic curve used to compute the first random key component is independent of an elliptic curve used for the identity based encryption operation.

10. The apparatus of claim 6, wherein the first random key component, xP, is computed from a random number x chosen by the first party and a point P of large prime order on an elliptic curve over a finite field.

11. A method for performing identity based encryption adapted to a communications session between a computer system of a first party (the first party) and a computer system of a second party (the second party), the method at the second party comprising the steps of:
receiving an encrypted first random key component corresponding to the first party;
decrypting the encrypted first random key component using a private key of the second party;
sending an encrypted second random key component directed to the first party, the second random key component having been computed at the second party and encrypted using a public key of the first party in accordance with an identity based encryption operation; and computing a session key for use in subsequent communications between the first party and the second party based at least in part on the first random key component.

12. The method of claim 11, wherein the encrypted second random key component is sent as part of an encrypted random key component pair that includes the encrypted first random key component.

13. The method of claim 11, further comprising the step of receiving the second random key component, in encrypted form, the second random key component having been encrypted using the public key of the second party in accordance with the identity based encryption operation.

14. The method of claim 11, wherein an elliptic curve used to compute the second random key component is independent of an elliptic curve used for the identity based encryption operation.

15. The method of claim 11, wherein the second random key component, yP, is computed from a random number y chosen by the second party and a point P of large prime order on an elliptic curve over a finite field.

16. An apparatus for performing identity based encryption adapted to a communications session between a computer system of a first party (the first party) and a computer system of a second party (the second party), comprising:
a processor and a memory communicatively connected to the processor, the processor configured to:
receive an encrypted first random key component corresponding to the first party;
decrypt the encrypted first random key component using a private key of the second party;
send an encrypted second random key component directed to the first party, the second random key component having been computed at the second party and encrypted using a public key of the first party in accordance with an identity based encryption operation; and
compute a session key for use in subsequent communications between the first party and the second party based at least in part on the first random key component.

17. The apparatus of claim 16, wherein the encrypted second random key component is sent as part of an encrypted random key component pair that includes the encrypted first random key component.

18. The apparatus of claim 16, the processor being further configured to receive the second random key component in encrypted form, the second random key component having been encrypted using the public key of the second party in accordance with the identity based encryption operation.

19. The apparatus of claim 16, wherein an elliptic curve used to compute the second random key component is independent of an elliptic curve used for the identity based encryption operation.

20. The apparatus of claim 16, wherein the second random key component, yP, is computed from a random number y chosen by the second party and a point P of large prime order on an elliptic curve over a finite field.

* * * * *